(12) United States Patent
Vogt et al.

(10) Patent No.: US 8,328,275 B2
(45) Date of Patent: Dec. 11, 2012

(54) VEHICLE CHILD SEAT

(75) Inventors: Thomas Vogt, Illerkirchberg (DE); Stefan Gebhardt, Weidenberg (DE); Jens Pöhner, Stadtsteinach (DE)

(73) Assignee: RECARO Child Safety GmbH & Co. KG, Marktleugast (DE)

( * ) Notice: Subject to any disclaimer, the term of this patent is extended or adjusted under 35 U.S.C. 154(b) by 57 days.

(21) Appl. No.: 12/759,982

(22) Filed: Apr. 14, 2010

(65) Prior Publication Data

US 2010/0264706 A1   Oct. 21, 2010

(30) Foreign Application Priority Data

Apr. 16, 2009 (DE) .......................... 10 2009 017 601

(51) Int. Cl.
*B60N 2/42* (2006.01)
(52) U.S. Cl. .................................................. 297/216.11
(58) Field of Classification Search .................. 297/253, 297/250.1, 216.11, 480
See application file for complete search history.

(56) References Cited

U.S. PATENT DOCUMENTS 5,685,603 A * 11/1997 Lane, Jr. .................. 297/216.11
7,401,834 B2 * 7/2008 Browne et al. ................ 296/68.1
2007/0228787 A1 10/2007 Nakhla
2008/0246316 A1 * 10/2008 Carine et al. ............. 297/216.11
2010/0109394 A1 * 5/2010 Ruthinowski et al. ... 297/216.11

FOREIGN PATENT DOCUMENTS

| DE | 19722096 | 12/1997 |
| DE | 198 48 231 A1 | 8/1999 |
| DE | 10251040 | 5/2004 |
| DE | 202005013257 | 11/2005 |
| DE | 102006011520 | 9/2007 |
| WO | WO2008056169 | 5/2008 |

* cited by examiner

Primary Examiner — Milton Nelson, Jr.
(74) Attorney, Agent, or Firm — McGlew and Tuttle, P.C.

(57) ABSTRACT

A vehicle child seat is provided for directly or indirectly fastening to a vehicle seat and/or a vehicle structure. The vehicle child seat includes a backrest, a seat surface, an integrated belt system for fastening a child in the vehicle child seat and a belt tensioning device (31). The belt tensioning device (31) includes a trigger sensor, an energy storage device and a tensioning mechanism which, when exceeding a defined force acting on the vehicle child seat, in particular a crash force, abruptly tensions the belt system. All components of the belt tensioning device (31) required for the belt tensioning function being fastened to or in the vehicle child seat and being able to be removed therewith from the vehicle. A belt force limiting function is incorporated in the belt tensioning device (31). After triggering the belt tensioning device (31) when exceeding a limit force $F_{grenz}$ on the belt portion (11, 12, 13, 15) at least one belt deflector (137, 171) is displaced sufficiently far in the direction of a normal position, until the limit force $F_{grenz}$ has fallen below or the belt deflector (137, 171) has completely reached its normal position.

20 Claims, 9 Drawing Sheets

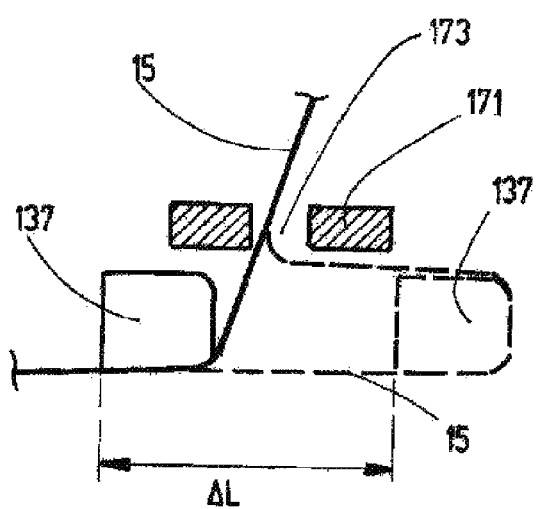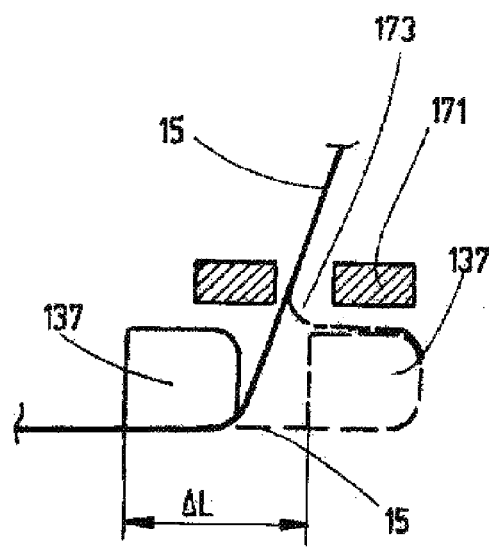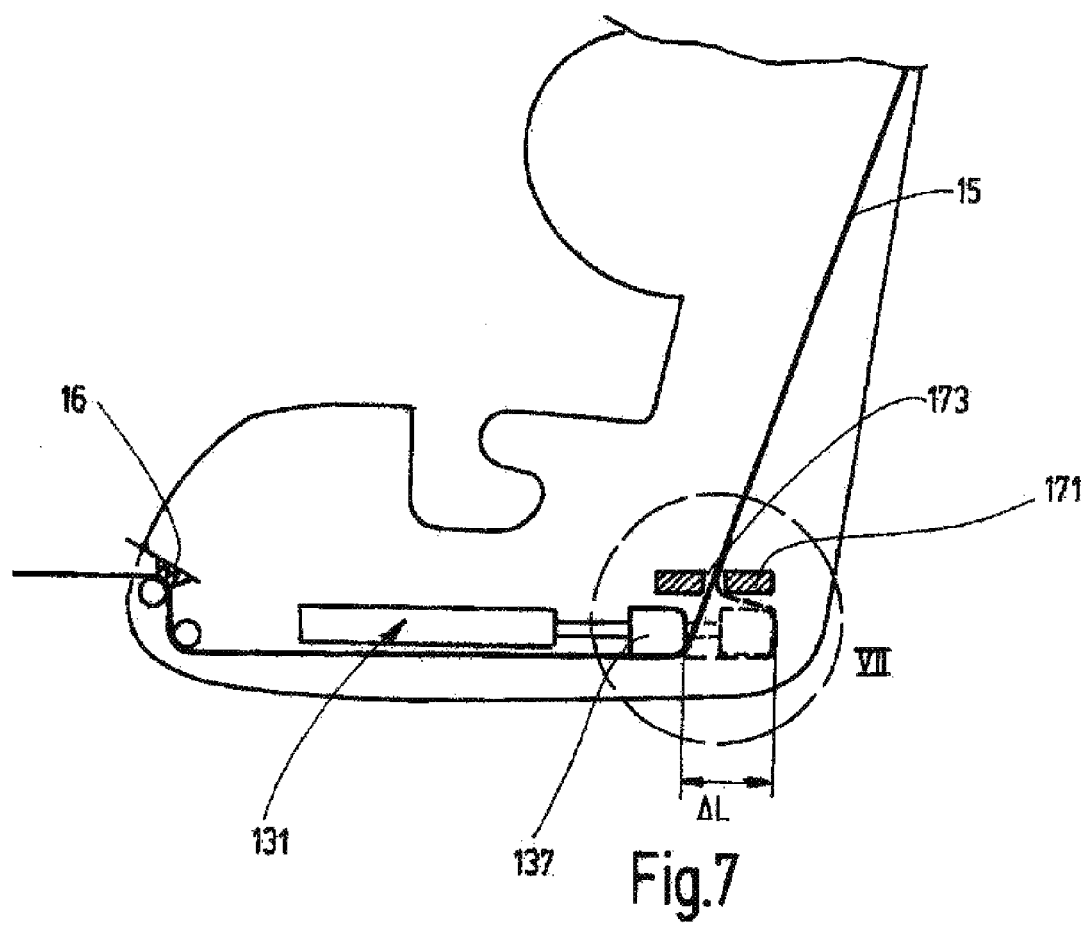

VEHICLE CHILD SEAT

CROSS REFERENCE TO RELATED APPLICATIONS

This application claims the benefit of priority under 35 U.S.C. §119 of German Patent Application DE 10 2009 017 601.2 filed Apr. 16, 2009, the entire contents of which are incorporated herein by reference.

FIELD OF THE INVENTION

The invention relates to a vehicle child seat for directly or indirectly fastening to a vehicle seat and/or a vehicle structure.

BACKGROUND OF THE INVENTION

Vehicle child seats, as are used for securing children in passenger vehicles, for example, are generally known. For securing the child in the child seat, either the belt system of the vehicle itself or an integrated child seat belt system is used. The child seat is positioned in the vehicle either directly onto the vehicle seat or indirectly onto a child seat base fastened in the vehicle, as is disclosed for example in DE 10 2006 011 520 A1. The fastening of the child seat and optionally of the child seat base in the vehicle takes place by means of the vehicle belt or a fastening system known by the term ISOFIX.

Belt tensioners for adult occupants of passenger motor vehicles are included in so-called passive safety systems. Belt tensioners tension the safety belts immediately before or during an accident. By tensioning the belt and the resulting tighter bearing of the belt against the body of the occupant, said occupant participates at an early stage in the deceleration of the vehicle and slipping down through the lap belt is prevented. In order to limit the forces produced on the occupant by means of the belt system, the belt tensioners may be combined with so-called belt force limiters which, from a defined belt force, for example, produce a specific unwinding of the belt strap from a belt retractor.

An optimal retaining action of a child in a vehicle child seat with an integrated belt system also requires the belt to bear as tightly as possible against the body. Thus it is also advantageous to incorporate the belt tensioning function in a child seat.

A vehicle child seat is disclosed in DE 197 22 096 A1 which has a retaining device consisting of an integrated belt system and belt tensioner arrangement. For triggering the belt tensioning function of the child seat, a sensor device as well as a control unit are required, of which at least the control unit is integrated outside the child seat in a fixed manner in the vehicle. When mounting the child seat in the vehicle, therefore, said child seat has to be attached by means of releasable plug connections to the control unit of the vehicle. If this inadvertently does not take place, the belt tensioning arrangement is inoperational. This fault is intended to be eliminated by additional monitoring means.

DE 102 51 040 A1 discloses a coupling device between the belt tensioning system of the vehicle itself and the belt system integrated in the child seat. A separate belt tensioning device is not provided in the child seat. The optimal retaining action of the child seat belt system is thus dependent on the presence of a belt tensioner in the vehicle. This is frequently not the case, however, in particular with rear seats of passenger motor vehicles, so that the use of the child seat remains restricted to specific vehicle models and/or to the front seats.

A vehicle child seat is disclosed in US 2007/0228787 A1 for directly fastening to a vehicle seat, comprising a backrest, a seat surface, an integrated belt system (10) for fastening a child in the vehicle child seat and a belt tensioning device comprising a trigger sensor, an energy storage device and a tensioning mechanism which, when exceeding a defined force acting on the vehicle child seat, in particular a crash force, abruptly tensions the belt system.

DE 20 2005 013 257 U1 discloses a belt force limiting function according to which, in the event of a crash and when exceeding a limit force, the belt is lengthened in a damped manner. A belt tensioner is not provided in this case.

SUMMARY OF THE INVENTION

The object of the invention is to improve a vehicle child seat with a belt tensioning function, in particular with regard to its universal use and the avoidance of mounting errors.

According to the invention, a vehicle child seat is provided for directly or indirectly fastening to a vehicle seat and/or a vehicle structure. The vehicle child seat comprises a backrest, a seat surface, an integrated belt system for fastening a child in the vehicle child seat; and a belt tensioning device. The belt tensioning device comprises a trigger sensor, an energy storage device and a tensioning mechanism. The tensioning mechanism abruptly tensions the belt system when a force acting on the vehicle child seat exceeds a defined crash force. All components of the belt tensioning device required for the belt tensioning function are fastened to the vehicle child seat or in the vehicle child seat to form a unit therewith and to be able to be removed therewith from the vehicle. The tensioning device includes a belt force limiting means to limit the a belt force applied. The belt force limiting means is incorporated in the belt tensioning device. After triggering the belt tensioning device and upon exceeding a limit force $F_{grenz}$ on the belt portion, at least one belt deflector is displaced sufficiently far in the direction of its normal position, until the force has fallen below the limit force $F_{grenz}$ or the belt deflector has completely reached its normal position.

As all components of the belt tensioning device required for the belt tensioning function are fastened to or in the child seat and may be removed therewith from the vehicle, the child seat is able to be used universally in all vehicle models and on all seats. The attachment of the child seat to belt tensioners, sensor devices or control units integrated in the vehicle is dispensed with, whereby errors when mounting the child seat in the vehicle are avoided. The monitoring of the operating capability of the belt tensioning device may take place outside the vehicle, as the child seat represents a self-contained system. An additional belt force limiter integrated in the belt tensioning device effectively limits the belt forces acting on a child strapped into the child seat. During or immediately after the belt tensioning, individual belt portions of the belt system yield again when a limit force is exceeded, so that injuries of the child due to high belt forces are avoided.

In a preferred embodiment, the belt tensioning device is a mechanical system in which the trigger sensor comprises a sensor mass, the inertia force thereof triggering the belt tensioning device in the event of a crash. Due to the purely mechanical construction, no external or internal power supply is required to the child seat.

The energy storage device required for the belt tensioning function is preferably formed by one or more springs; in principle, the present invention, however, also includes pyrotechnical, hydraulic or pneumatic systems.

The belt tensioning in the event of a crash results from a spatial displacement of a first belt deflector, which deflects a belt portion of the integrated belt system.

By means of a second belt deflector a pulley block may be formed which effects a greater movement i.e. tensioning of the belt system relative to the movement of the first belt deflector.

The belt tensioning device is, in principle, suitable for integration in all types of child seat and for all age groups from newborns via toddlers to children up to 12 years old and for use in or counter to the direction of travel. The vehicle child seats according to the invention are, in particular, motor vehicle child seats for use in passenger motor vehicles, minibuses, buses, rail vehicles or aircraft. However, an embodiment for other vehicles, in particular bicycles is also possible.

The invention is described in more detail hereinafter with reference to two exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is a schematic view of the adjusting belt path of a second exemplary embodiment in the normal state and in dashed lines in the triggered state;

FIG. 7a is a detail view showing a detail VII from FIG. 7;

FIG. 7b is a detail view showing a detail corresponding to FIG. 7 after the belt force limiting has taken place;

DESCRIPTION OF THE PREFERRED EMBODIMENTS

Figure 1:
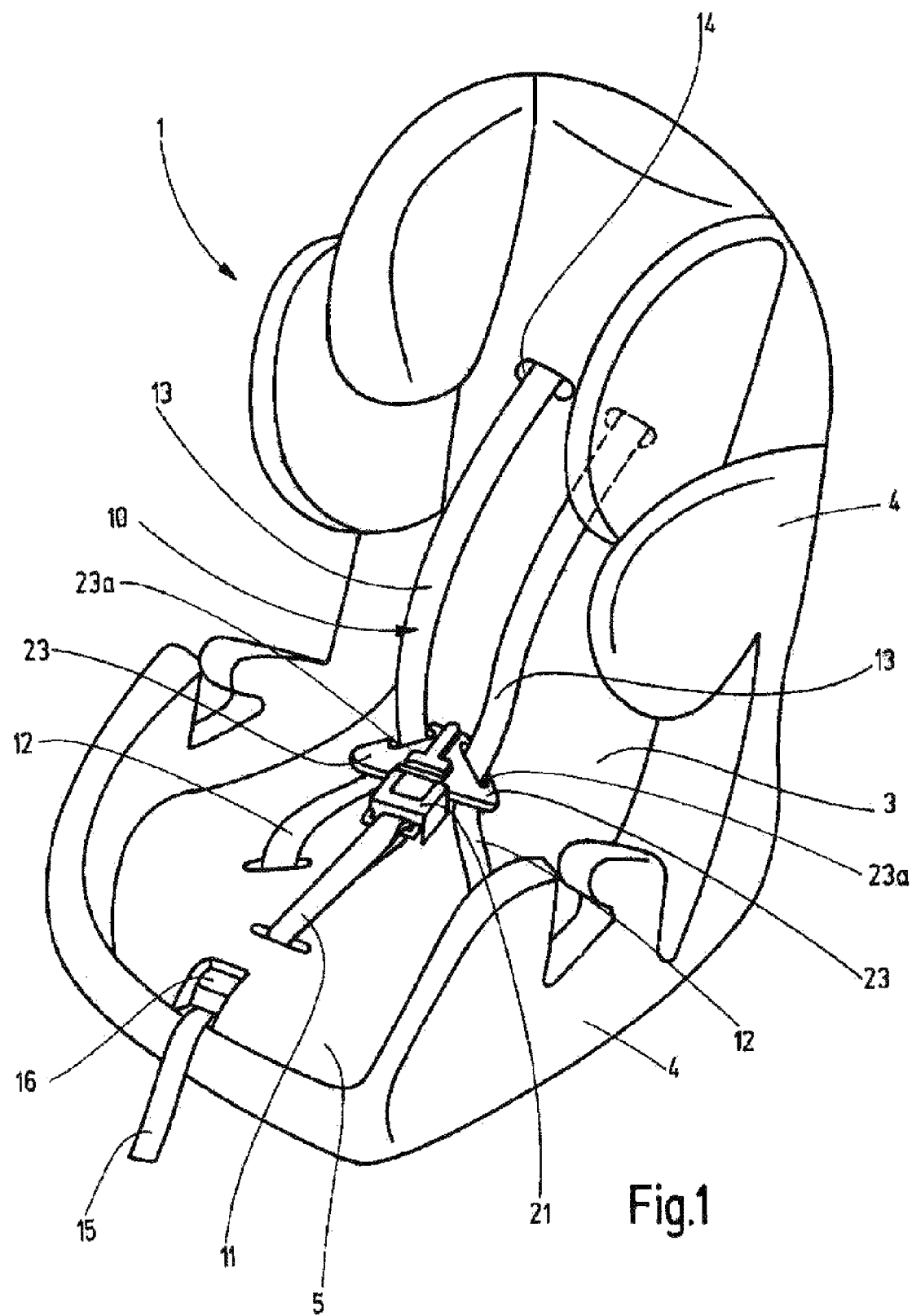
FIG. 1 is a perspective view of the vehicle child seat obliquely to the front.

Referring to the drawings in particular, a vehicle child seat 1 shown in FIG. 1 for the transport of toddlers or children is positioned during mounting in the vehicle in the direction of travel, directly on the vehicle seat and fixed via the vehicle belt system which is present, in particular a 3-point belt. Alternatively, the child seat may be fastened indirectly onto the vehicle seat by means of a child seat base fastened to the vehicle seat or to the vehicle structure. In a modification of the exemplary embodiments described below, the vehicle child seat may also be fastened by means of a mechanical rapid fastening system, as is known for example by the term ISO-FIX, to the vehicle seat or the child seat base. ISOFIX is standardized in the ISO standard 13216.

The directional information used below relates to the mounting of the vehicle child seat on the vehicle seat in the conventional direction of travel of the vehicle.

The structure of the child seat 1 consists of a padded plastic seat shell, which is divided substantially into backrest 3 and seat surface 5 regions, which are connected integrally to one another or alternatively are pivotable and lockable relative to one another by means of a horizontal hinge. The lateral support of the child takes place in each case by a side support 4 to the left and right of the backrest 3 and the seat surface 5.

Figure 2:
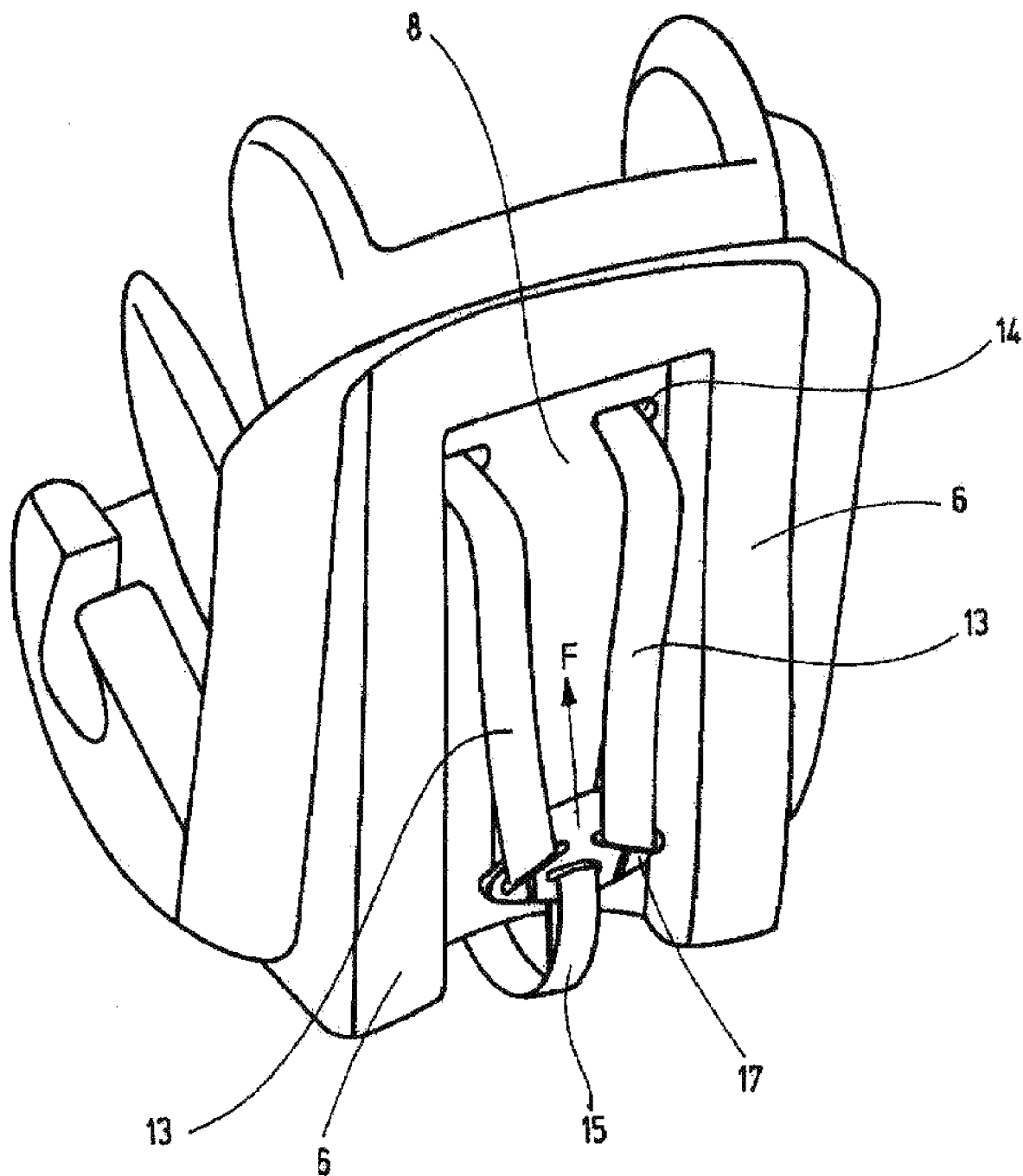
FIG. 2 is a perspective view of the vehicle child seat obliquely to the rear.

In the child seat a 5-point belt system 10 is incorporated which has a belt buckle 21, which connects five belt portions to one another. The first belt portion is a crotch belt 11 which, starting from the belt buckle 21, extends to the front region of the seat surface 5 and is fastened thereto. Two lower lateral belt portions, the lap belts 12, are anchored by their lower ends in each case in the outer region of the seat surface 5, and extend from there as far as the belt buckle 21, where in each case they are passed through a slot-shaped through-guide 23a of two belt tongues 23 which may be locked to the belt buckle. In the further path of the lap belts, in the through-guides 23a the two lap belts 12 merge in one piece with one of two respective shoulder belts 13 which form the remaining belt portions of the 5-point belt system 10. The shoulder belts 13 are passed in the upper region of the backrest 3 through two through-guides 14 of the backrest 3 and, as may be seen in FIG. 2, coupled to one another in the region of the rear side of the backrest 3 by means of a connecting element 17. Starting from this connecting element 17 an adjusting belt 15 extends through a recess 8 shown in FIG. 3, of a seat bearing surface 6 located below the seat surface 5 and connected thereto in one piece, and in the front region of the seat shell bearing surface 6 is passed through said seat shell bearing surface. To this end, in the front region of the seat surface 5 a recess is formed, in which a belt securing device 16 known per se is arranged. This permits the adjusting belt to be pulled through only in the direction of the front edge of the child seat. In the other direction, the adjusting belt 15 may only be pulled by unlocking the belt securing device 16.

To permit the child to be placed in and removed from the seat, by actuating an unlocking button of the belt buckle 21 the two belt tongues 23 may be removed therefrom and subsequently inserted therein and locked again. The belt system 10, which bears against the child, may be tensioned by pulling on the adjusting belt 15 and thus adapted, in particular, to the size of the child. In this connection, the effective length of the shoulder belts 13 between the through-guides 23a of the belt tongues 23 and the through-guides 14 of the backrest 3 is altered so that the crotch belt 11, the lap belts 12 as well as the shoulder belts 13 bear more tightly against the body of the child.

Figure 3:
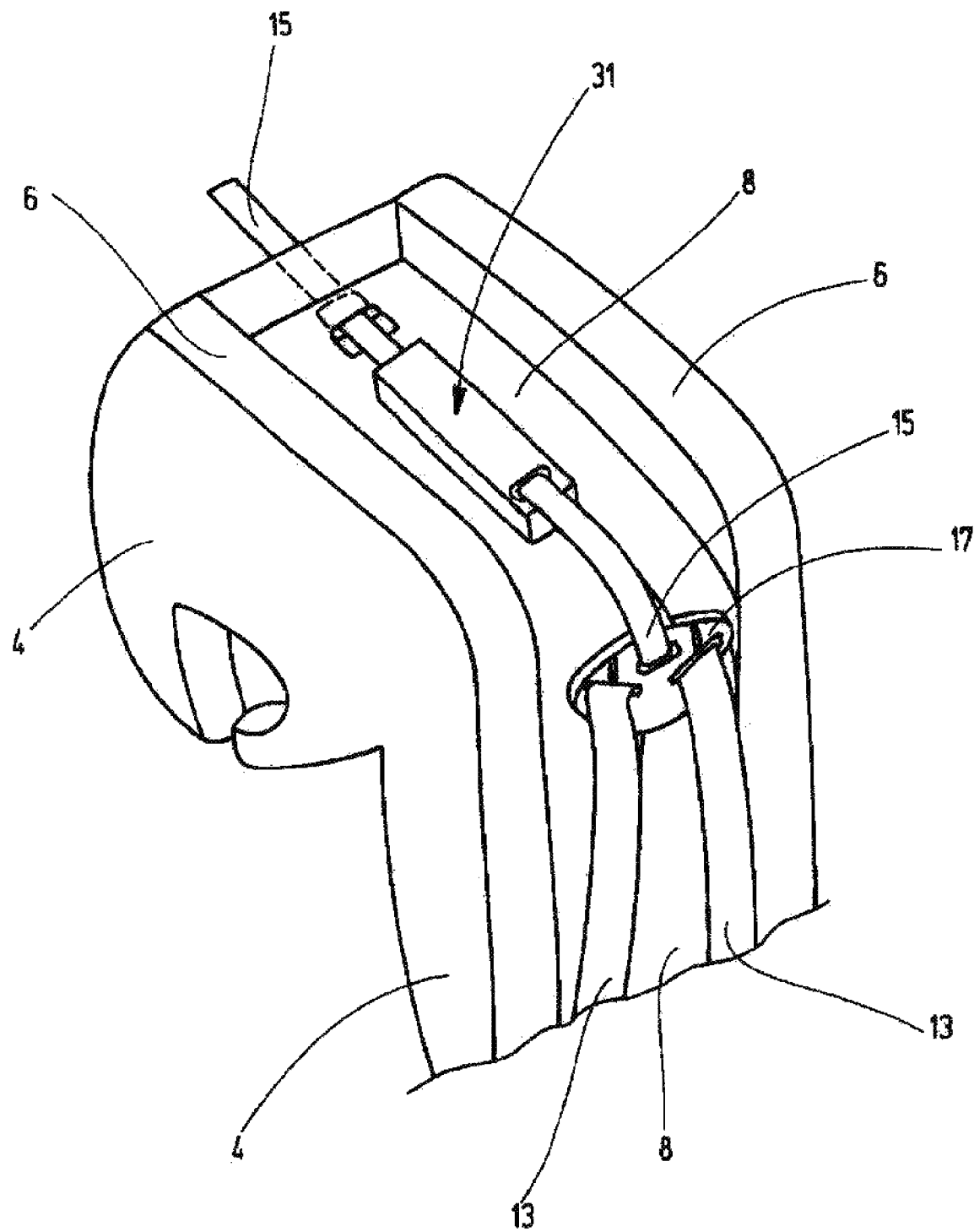
FIG. 3 is a perspective view of the vehicle child seat obliquely from below, the belt tensioning device being shown simplified and schematically.

The adjusting belt 15 cooperates with a belt tensioning device 31, which is also arranged in the recess 8 of the seat shell bearing surface 6. In FIG. 3, said belt tensioning device 31 is shown schematically and simplified. Two exemplary embodiments are described hereinafter.

Figure 4:
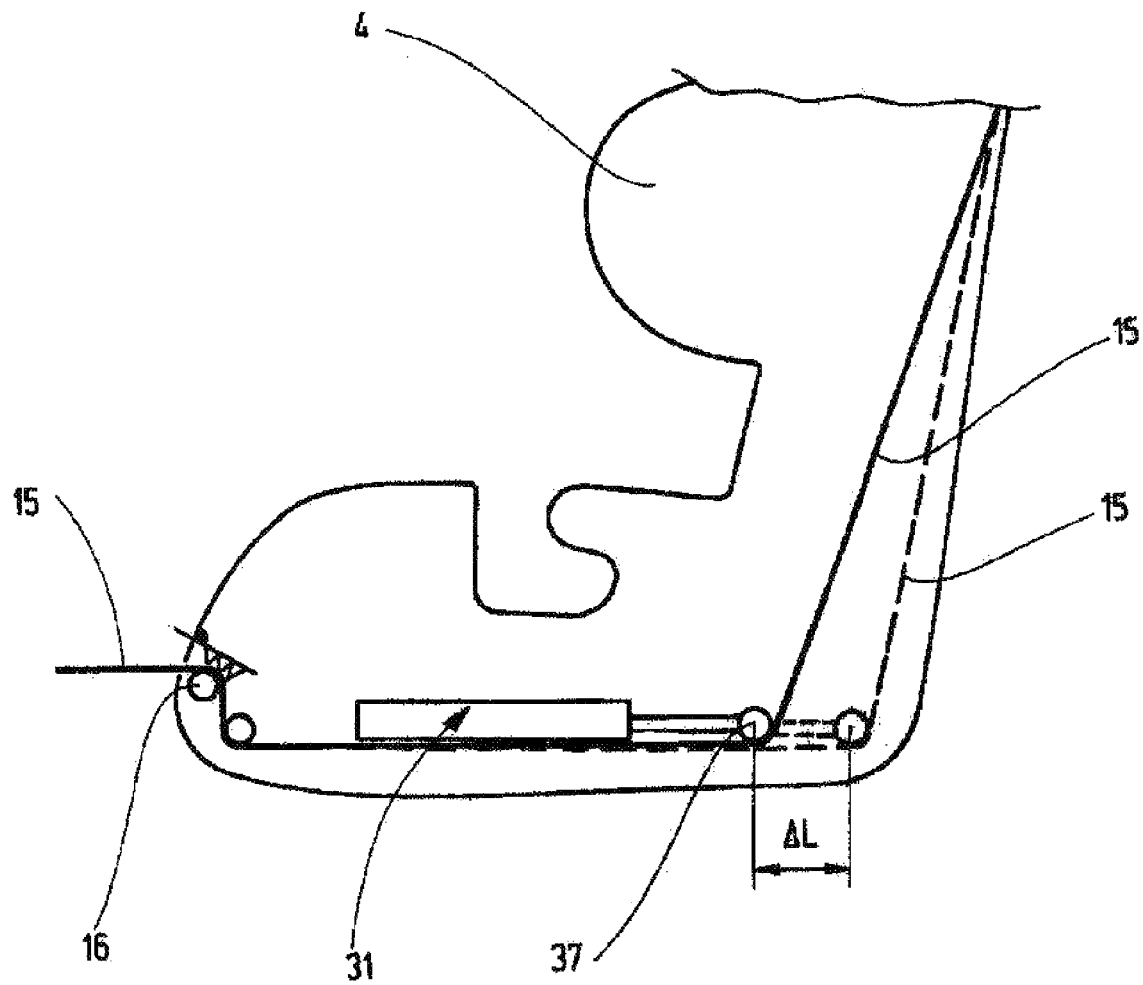
FIG. 4 is a schematic view of the adjusting belt path of a first exemplary embodiment in the normal state and in dashed lines in the triggered state.

FIG. 4 shows a schematic view of the path of the adjusting belt 15 of a first exemplary embodiment in the normal state and in dashed lines in the triggered state. The adjusting belt 15 is deflected on a first belt deflector 37 of the belt tensioning device 31 positioned in the rear region of the recess 8. Proceeding from the first belt deflector 37, a portion of the adjusting belt 15 passes through in a freely movable manner between the belt tensioning device 31 and the seat surface 5 to the front towards the belt securing device 16 and is fixed there. The other portion of the adjusting belt 15, starting from the first belt deflector 37, passes behind the backrest 3 upwards and is coupled as described above to the connecting element 17.

When the belt tensioning device 31 is triggered in the event of a crash, the first belt deflector 37 and thus the deflection point of the adjusting belt 15 is moved to the rear by the travel ΔL. The adjusting belt path is altered such that the length of the belt portion of the belt system 10 between the belt securing device 16 and the through-guides 14 of the shoulder belts 13 through the backrest 3 is lengthened. As the adjusting belt is fixed securely by means of the belt securing device 16, accordingly the belt strap of the shoulder belts 13 is pulled from the front side of the backrest 3 through the through-guides 14 in the direction of the rear face of the backrest, so that less belt strap is present in front of the backrest 3. As a result, the belt slack between a child sitting in the vehicle child seat 1 and the 5-point belt system 10 is reduced and/or eliminated.

Figure 5:
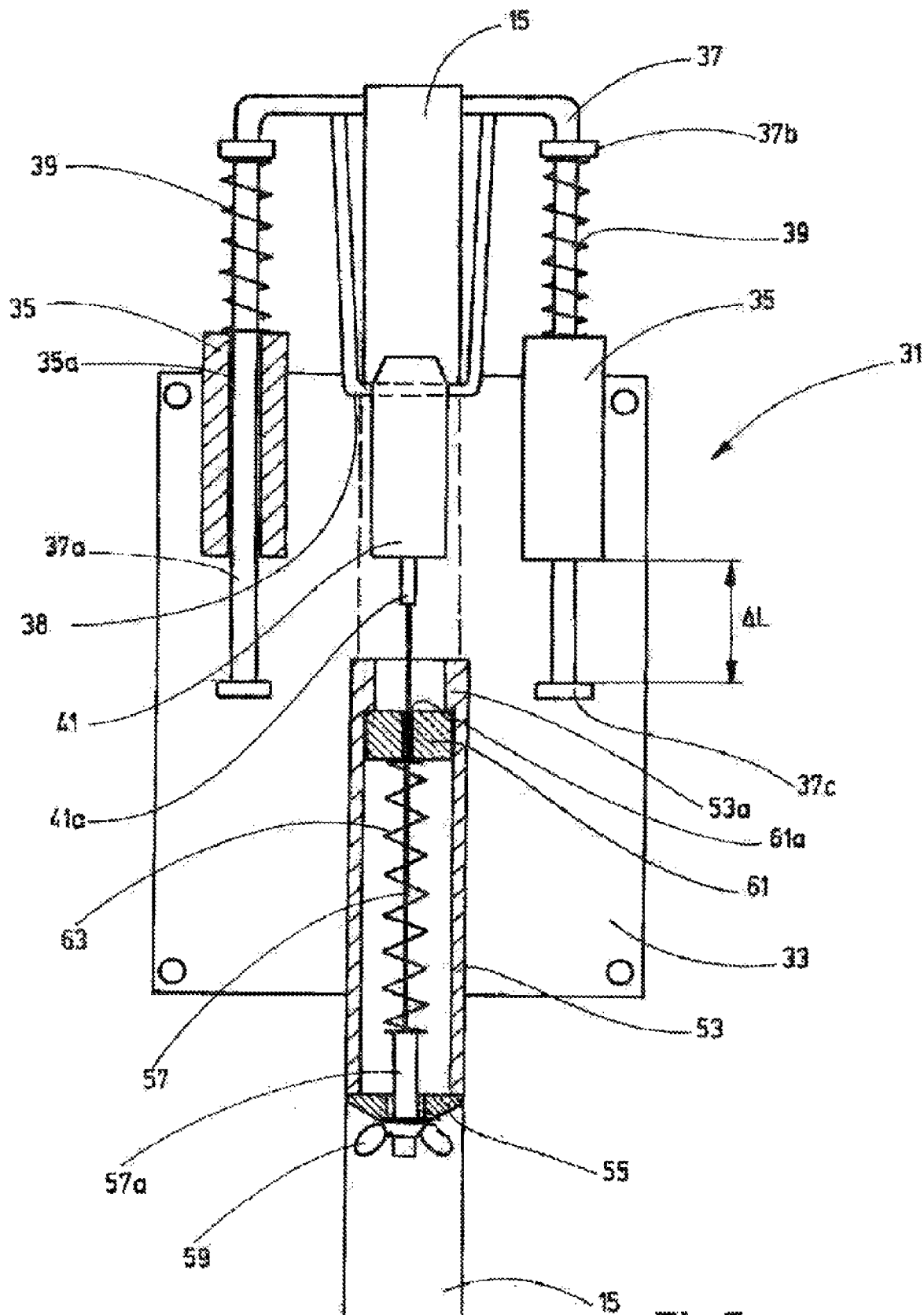
FIG. 5 is a partially sectional view showing the belt tensioning device of the first exemplary embodiment in the normal state.

The first exemplary embodiment shown in FIG. 5 is disclosed in detail below. A support plate 33 connected below the seat surface 5 in the recess 8 of the seat shell bearing surface 6 fixedly connected to the seat surface 5, has two guides 35 fixedly connected thereto. The guides 35 are respectively provided with a bore 35*a*, which receive one respective limb 37*a* of the substantially U-shaped first belt deflector 37, and guide said limb movably in a linear manner. One respective energy storage device 39 in the form of a spring is arranged between the guides 35 and one respective shoulder 37*b* of the limbs 37. Preferably, the springs 39 are compression springs, which are received by the limbs 37*a* and secured against buckling. The two springs 39 act on the first belt deflector and produce in the triggered state of the belt tensioning device 31 the travel ΔL of the first belt deflector in the direction of the triggered position. In each case a second shoulder 37*c* serves as a travel limiter at the end of each limb 37. The second shoulder 37*c* consists, for example, of a cylindrical bushing pushed on after mounting the springs 39.

Between the limbs 37*a* of the first belt deflector 37, a counter element 38 is arranged and fixedly connected thereto. The counter element 38 has a U-shape with slightly outwardly bent limbs and preferably consists of a material with a circular cross-section and a diameter of 6 mm.

Also fixedly connected to the support plate 33 is a housing 53 aligned approximately in the direction of travel and, in particular, of hollow cylindrical configuration. In the inside of the housing 53 a sensor mass 61 is movably guided therein. The sensor mass 61 has in the central point of its, in particular, circular cross section a bore 61*a*, which extends parallel to the cylindrical alignment of the housing 53. Through this bore 61*a* runs a cable control 57 which, with its first end, is fastened to a triggering device 41*a* of a connector 41 fastened to the support plate 33. The connector 41 serves for locking the first belt deflector 37 in the normal position and is a locking device generally known as an "ISOFIX connector", as is disclosed for example in DE 198 48 231 A1. In principle, however, all known locking systems are suitable as connectors 41 for locking counter elements, such as, for example, rotary latch locks. The connector 41, the first belt deflector 37, the guide 35 thereof and the counter element 38 represent the essential elements of the tensioning mechanism.

The second end of the cable control 57 is formed by a molded-on threaded rod portion 57*a*, which passes through a bore of a closure 55, which closes the end of the housing 53 remote from the first belt deflector 37. The threaded rod portion 57*a* projecting from the housing 53 and/or the closure 55 is secured by a wing nut 59. In the inside of the housing 53 a sensor spring 63 is supported, on the one hand, on the front face of the threaded rod and, on the other hand, on the sensor mass 61 and tensions said sensor mass against a stop 53*a* of the housing 53. The stop 53*a* is preferably formed by a reduction in diameter in the inside of the cylindrical housing. The sensor mass 61 and the sensor spring 63 together form the trigger sensor of the belt tensioning device 31.

Figure 6:
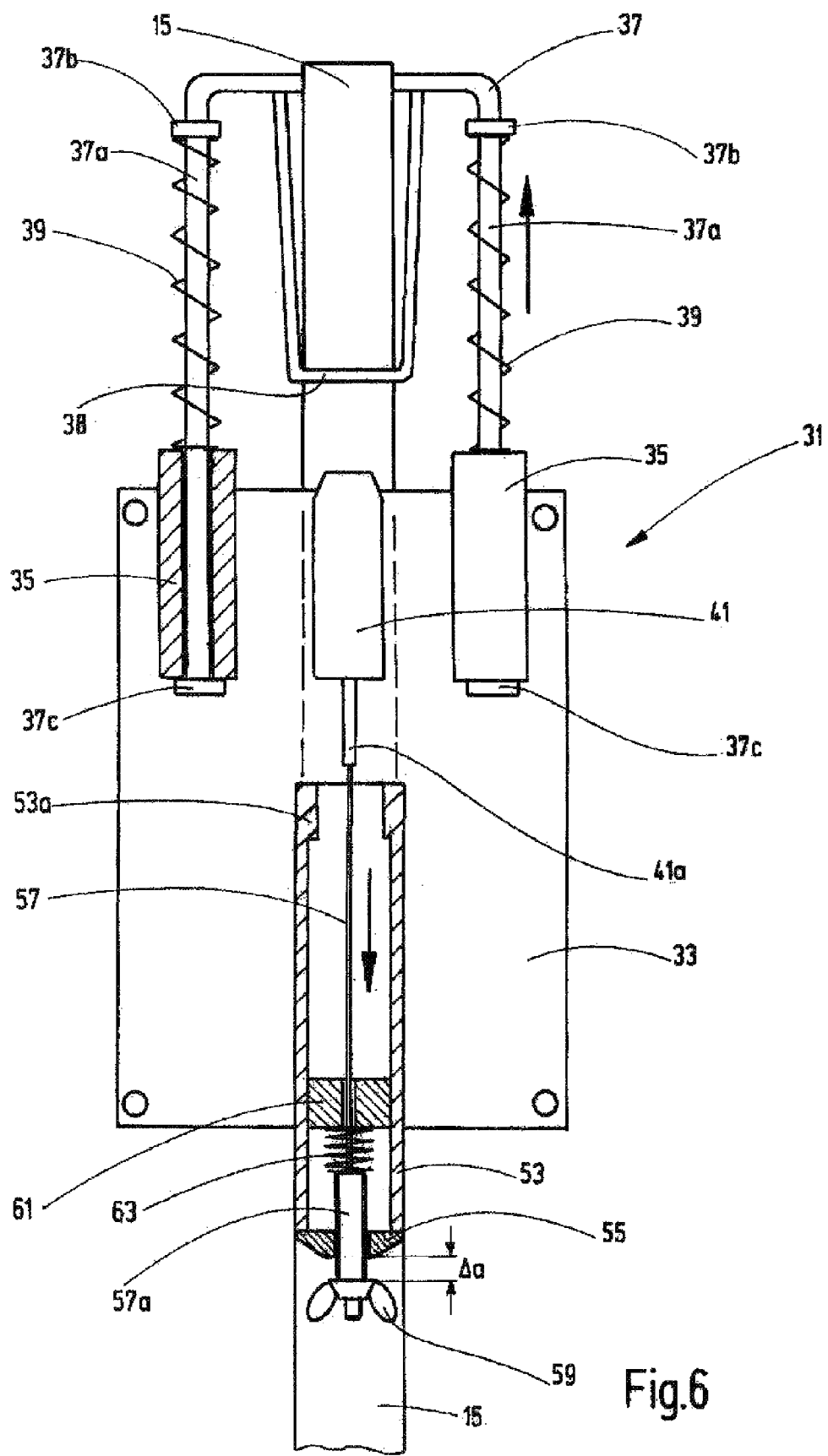
FIG. 6 is a partially sectional view showing the belt tensioning device of the first exemplary embodiment in the triggered state.

In the event of a crash shown in FIG. 6, due to acceleration forces the sensor mass 61 is moved in the housing in the direction of travel, i.e. in the direction of the closure 55, and thus tensions the spring 63. As a result, a force is transmitted to the control cable 57. As soon as this force exceeds the triggering force of the connector 41, a triggering travel Δa of the triggering device 41*a* takes place and the counter element 38 and thus the first belt deflector 37 is released, which is moved due to the force of the now relaxed springs 39 into the triggered position. The triggering force of the connector 41 is understood to be the force which has to act on the triggering device 41*a* in order to overcome the spring forces and friction inside the connector 41, and to unlock said connector. The mass of the sensor mass 61 and the triggering force of the connector 41 represent in the structural design of the trigger sensor the essential controlled variables for the triggering threshold of the belt tensioning device.

FIG. 7 and FIG. 7*a* show a schematic view of the path of the adjusting belt 15 of a second exemplary embodiment in the normal state and in dashed lines in the triggered state. The adjusting belt 15 is deflected at a first belt deflector 137 of the belt tensioning device 131 positioned in the rear region of the recess 8. Starting from the first belt deflector 137 a portion of the adjusting belt 15 passes through freely movably between the belt tensioning device 131 and the seat surface 5 to the front towards the belt securing device 16 and is fixed there. The other portion of the adjusting belt 15 starting from the first belt deflector 137 runs upwards through, in particular, a slot-shaped opening 173 of a second belt deflector connected fixedly and thus immovably to the vehicle child seat 1 behind the backrest 3 and is coupled as disclosed above to the connecting element 17.

When triggering the belt tensioning device 131, the first belt deflector 137 and thus the deflection point of the adjusting belt 15 is moved to the rear by the travel ΔL relative to the fixed second belt deflector 171. As the adjusting belt 15 passes through the opening 173 of the second belt deflector 171, the adjusting belt is deflected on the first belt deflector 137 preferably by approximately 150° to 180° and runs in the opposing direction as far as the opening 173 of the second belt deflector 171. The adjusting belt 15 is again deflected thereon by preferably 80° to 130° and runs further upwards behind the backrest 3. The adjusting belt path is deflected as a whole so that the length of the belt portion of the belt system 10 between the belt securing device 16 and the through-guides 14 of the shoulder belts 13 through the backrest 3 is lengthened. As the adjusting belt is securely fixed by means of the belt securing device 16, accordingly the belt strap of the shoulder belts 13 is pulled through from the front side of the backrest 3 through the through-guides 14 in the direction of the rear side of the backrest, so that as in the first exemplary embodiment less belt strap is present in front of the backrest 3. The arrangement of the first belt deflector 137 and the second belt deflector 171 and/or the relative movement thereof to one another produce a pulley block effect, through which the travel of the adjusting belt 15 behind the second belt deflector 171 is approximately double the size of the travel ΔL of the first belt deflector 137.

FIG. 7b shows in a schematic view an additional belt force limiting function of the second exemplary embodiment. A child strapped into the child seat acts in the event of a crash on the belt system 10 with a force F, during or immediately after the belt tensioning. Corresponding reaction forces act via the belt system 10 on the body of the child and are limited as described below by the belt force limiting function. By the previously described arrangement of the first and second belt deflectors and the resulting pulley block effect, double the force F acts on the first belt deflector 137 in the direction of the original, untriggered normal position. When the force exceeds a limit force $F_{grenz}$ the first belt deflector 137 is moved back sufficiently far until the force has again fallen below the limit force $F_{grenz}$, or the belt deflector 137 has again completely reached its normal position.

Figure 8:
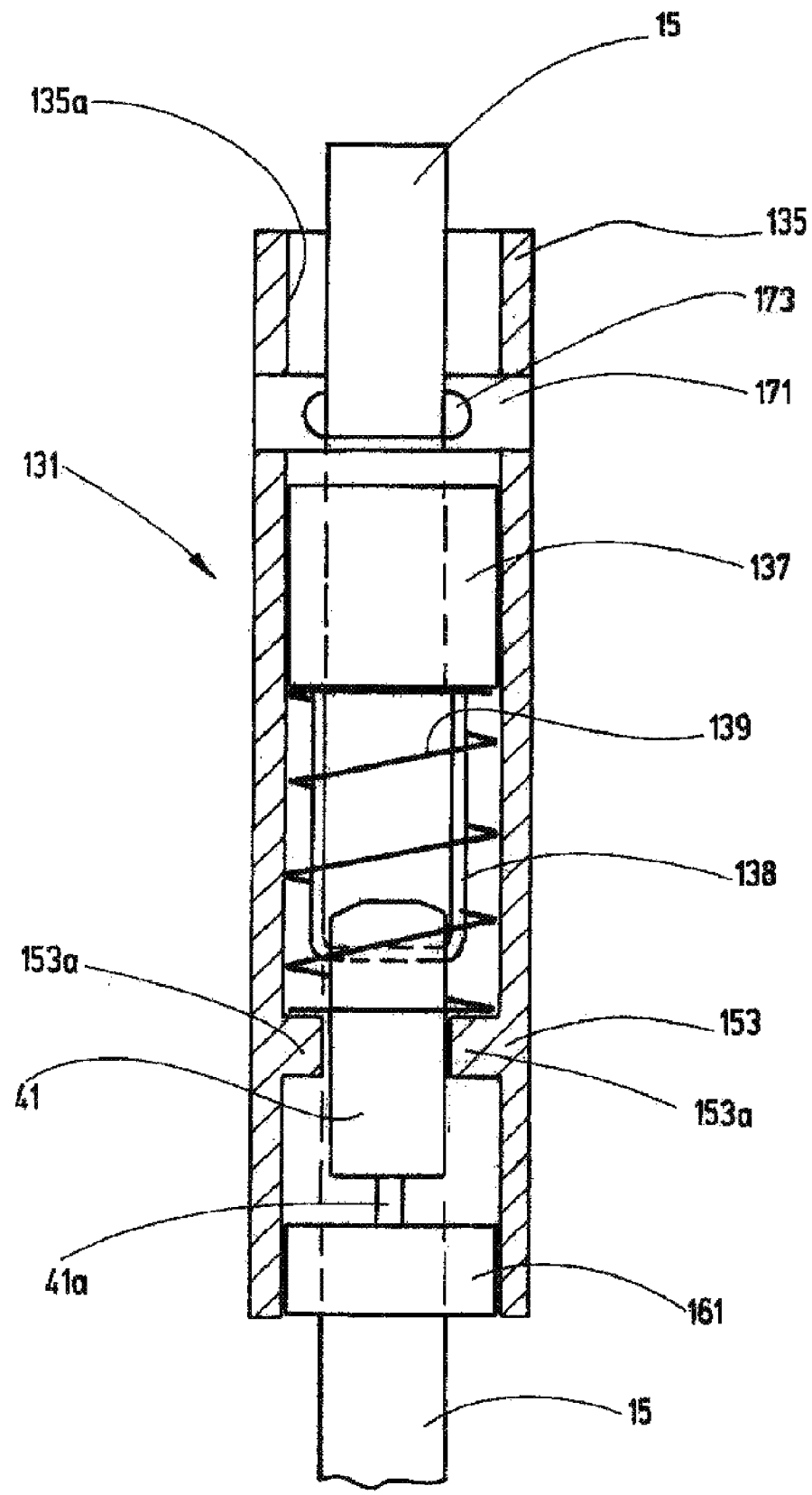
FIG. 8 is a partially sectional view showing a belt tensioning device of the second exemplary embodiment in the normal state.

The second exemplary embodiment shown in FIG. 8 is disclosed in detail below. A housing 153 fixedly connected below the seat surface 5 in the recess 8 of the seat shell bearing surface 6 to the seat surface 5, has a guide 135 connected thereto, in which the first belt deflector 137 in the form of a slide is received and is guided in a linear displaceable manner. Between the first belt deflector 137 and a shoulder 153a of the guide, an energy storage device 139 in the form of a spring is arranged. Preferably, the spring 139 is a compression spring which is secured externally by the guide 135 against buckling. The spring 139 acts upon the first belt deflector 137 and produces in the triggered state of the belt tensioning device 31 the travel ΔL of the first belt deflector 137 in the direction of the triggered position.

The adjusting belt 15 is guided through the opening 173 of the second belt deflector 171, which is connected to the housing 153. Thus the previously described belt path is implemented.

On the first belt deflector 137 a counter element 138 is fastened. The counter element 138 extends inside the housing 153 and has a U-shape with limbs, which are configured parallel to the guide 135 and the ends thereof are fixedly connected to the first belt deflector 137. The counter element 138 preferably consists of a material with a circular cross-section and a diameter of 6 mm.

The connector 41 is located in the housing 153, fixedly connected thereto. A sensor mass 161 is directly fastened to the triggering device 41a of the connector 41, in particular screwed on. Inside the housing 153, the sensor mass 161 is freely movable within limits, so that the necessary triggering travel Δa of the triggering device 41a is permitted. A sensor spring corresponding to the sensor spring 63 of the first exemplary embodiment is dispensed with in the second exemplary embodiment, so that the trigger sensor substantially consists of the sensor mass 161. The connector 41, the first belt deflector 137, the guide thereof 135, the counter element 138 and the second belt deflector 171 represent the essential elements of the tensioning mechanism.

Figure 9:
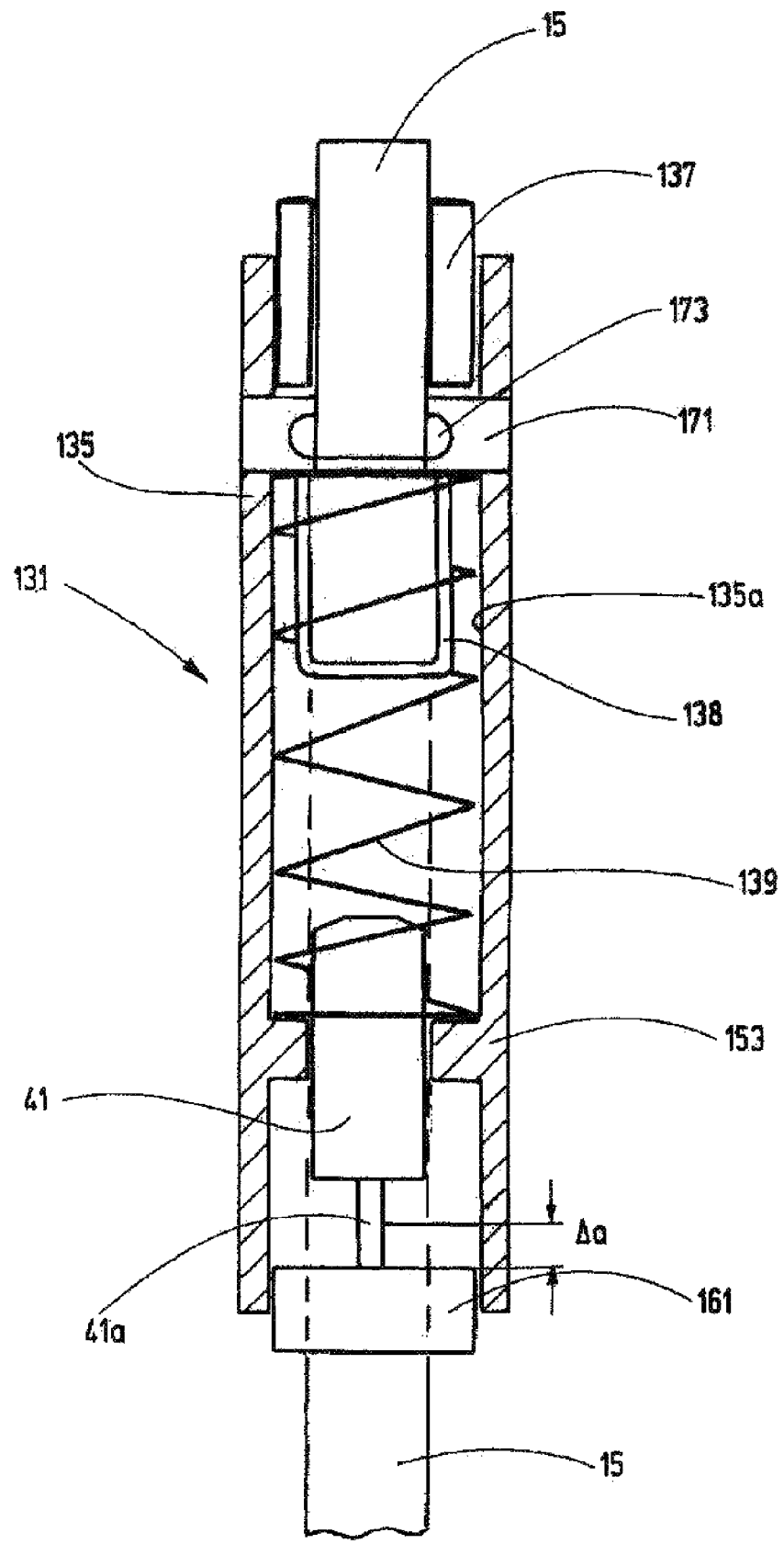
FIG. 9 is a partially sectional view showing the belt tensioning device of the second exemplary embodiment in the triggered state.

In the event of a crash shown in FIG. 9, the inertia force of the sensor mass 161 acts directly on the triggering device 41a. As soon as this force exceeds the triggering force of the connector 41, said connector opens and releases the counter element 138 and thus the first belt deflector 137 which, due to the force of the now relaxed springs 139, is moved into the triggered position.

After the triggering of the belt tensioning device 131, for restoring to the normal state, the first belt deflector 137 is forced back counter to the force of the spring 139 in the guide 135 sufficiently far until the counter element 138 is again locked to the connector 41. Thus the vehicle child seat 1 and the belt tensioning device thereof may be used repeatedly in a reversible manner.

While specific embodiments of the invention have been described in detail to illustrate the application of the principles of the invention, it will be understood that the invention may be embodied otherwise without departing from such principles.

APPENDIX

List of Reference Numerals

1 Vehicle child seat
2 Backrest
3 Side support
5 Seat surface
6 Seat shell bearing surface
8 Recess
10 Belt system
11 Crotch belt
12 Lap belt
13 Shoulder belt
14 Through-guide
15 Adjusting belt
17 Belt securing device
19 Connecting element
21 Belt buckle
23 Belt tongue
23a Through-guide
31, 131 Belt tensioning device
33 Support plate
35, 135 Guide
35a, 135a Bore
37, 137 First belt deflector
37a Limb
37b *First shoulder*
37b Second shoulder
38, 138 Counter element
39, 139 Energy storage device
41 Connector
41a Triggering device
53, 153 Housing
53a, 153a Stop
55 Closure
55a Through-hole
57 Cable control
57a Threaded rod
59 Wing nut
61, 161 Sensor mass
61a Bore
63 Sensor spring
171 Second belt deflector
173 Opening
Δa Triggering travel
ΔL Travel
F Belt force
$F_{grenz}$ Limit force

What is claimed is:
1. A vehicle child seat for directly or indirectly fastening to a vehicle seat and/or a vehicle structure, the vehicle child seat comprising:
 a backrest;
 a seat surface;
 an integrated belt system for fastening a child in the vehicle child seat; and a belt tensioning device comprising a trigger sensor, an energy storage device and a tensioning mechanism, the tensioning mechanism abruptly tensioning the belt system when a force acting on the vehicle child seat exceeds a defined crash force, all components of the belt tensioning device required for the belt tensioning function being fastened to the vehicle child seat or in the vehicle child seat and being able to be removed therewith from the vehicle, the tensioning device including a belt force limiting function incorporated therewith in the belt tensioning device, and after triggering the belt tensioning device and upon a force on a belt portion exceeding a limit force $F_{grenz}$ on the belt portion, at least one belt deflector is displaced sufficiently far in a direction of a normal position of the belt deflector, until the force on said belt portion has fallen below said limit force $F_{grenz}$ or until the belt deflector has completely reached its normal position.

2. The vehicle child seat as claimed in claim 1, wherein the trigger sensor comprises a sensor mass, an inertia force of the sensor mass, in an event of a crash, acting on the tensioning mechanism and triggering the belt tensioning device.

3. The vehicle child seat as claimed in claim 1, wherein the energy storage device comprises one or more springs.

4. The vehicle child seat as claimed in claim 1, wherein the tensioning mechanism comprises a belt deflector acted upon by the energy storage device, the belt deflector deflecting a belt portion of the belt system and in an event of a crash being moved from a normal position into a crash position.

5. The vehicle child seat as claimed in claim 4, wherein the tensioning mechanism comprises an additional belt deflector which additionally deflects the belt portion.

6. The vehicle child seat as claimed in claim 5, wherein the belt portion, the belt deflector and the additional belt deflector form a pulley block.

7. The vehicle child seat as claimed in claim 1, wherein the tensioning mechanism comprises a connector for locking a movable counter element of the belt deflector.

8. The vehicle child seat as claimed in claim 7, wherein the connector corresponds in construction to an ISOFIX connector and may be unlocked by a triggering device.

9. The vehicle child seat as claimed in claim 8, wherein a sensor mass is attached directly or indirectly to the triggering device.

10. The vehicle child seat as claimed in claim 1, wherein the trigger sensor, the energy storage device and the tensioning mechanism are accommodated or attached in and/or on a single housing.

11. A vehicle child seat for directly or indirectly fastening to a vehicle seat and/or a vehicle structure, the vehicle child seat comprising:

a backrest;
a seat surface;
an integrated belt system for fastening a child in the vehicle child seat; and
a belt tensioning device fully connected to the vehicle child seat to form a system with the backrest, the seat surface and the integrated belt system, wherein the system may be inserted into the vehicle and removed from the vehicle as a unit, the belt tensioning device comprising a trigger sensor, an energy storage device and a tensioning mechanism, the tensioning mechanism tensioning the belt system when a force acting on the vehicle child seat exceeds a defined crash force, the tensioning device incorporating a belt force limiting means including at least one displaceable belt deflector for limiting a force applied via the belt system upon displacement of the displaceable belt deflector caused by force exceeding a limit force.

12. The vehicle child seat as claimed in claim 11, wherein the trigger sensor comprises a sensor mass, an inertia force of the sensor mass, in an event of a crash, acting on the tensioning mechanism and triggering the belt tensioning device.

13. The vehicle child seat as claimed in claim 12, wherein the energy storage device comprises one or more springs.

14. The vehicle child seat as claimed in claim 13, wherein the tensioning mechanism comprises a belt deflector acted upon by the energy storage device, the belt deflector deflecting a belt portion of the belt system and in the event of a crash being moved from a normal position into a crash position.

15. The vehicle child seat as claimed in claim 14, wherein the tensioning mechanism comprises an additional belt deflector which additionally deflects the belt portion.

16. The vehicle child seat as claimed in claim 15, wherein the belt portion, the belt deflector and the additional belt deflector form a pulley block.

17. The vehicle child seat as claimed in claim 11, wherein the tensioning mechanism comprises a connector for locking a movable counter element of the displaceable belt deflector.

18. The vehicle child seat as claimed in claim 17, wherein the connector corresponds in construction to an ISOFIX connector and may be unlocked by a triggering device.

19. The vehicle child seat as claimed in claim 18, wherein the trigger sensor comprises a sensor mass which is attached directly or indirectly to the triggering device.

20. The vehicle child seat as claimed in claim 11, wherein the trigger sensor, the energy storage device and the tensioning mechanism are accommodated or attached in and/or on a single housing.

* * * * *